(12) United States Patent
Park

(10) Patent No.: US 11,408,151 B2
(45) Date of Patent: Aug. 9, 2022

(54) DEVICES AND METHODS FOR COLLECTING AND IRRIGATING WATER FOR PLANT GROWTH IN DRY REGIONS

(71) Applicant: HaeYoung Park, Anyang-St (KR)

(72) Inventor: HaeYoung Park, Anyang-St (KR)

( * ) Notice: Subject to any disclaimer, the term of this patent is extended or adjusted under 35 U.S.C. 154(b) by 126 days.

(21) Appl. No.: 17/041,257

(22) PCT Filed: Mar. 24, 2019

(86) PCT No.: PCT/IL2019/050328
§ 371 (c)(1),
(2) Date: Sep. 24, 2020

(87) PCT Pub. No.: WO2019/186532
PCT Pub. Date: Oct. 3, 2019

(65) Prior Publication Data
US 2021/0054603 A1    Feb. 25, 2021

(30) Foreign Application Priority Data

Mar. 25, 2018 (IL) .......................................... 258339

(51) Int. Cl.
*E03B 3/28* (2006.01)
*A01C 23/04* (2006.01)
*A01G 25/06* (2006.01)

(52) U.S. Cl.
CPC .............. *E03B 3/28* (2013.01); *A01C 23/042* (2013.01); *A01G 25/06* (2013.01)

(58) Field of Classification Search
CPC ...... A01C 23/042; A01G 25/06; A01G 25/02; E03B 3/28
See application file for complete search history.

(56) References Cited

U.S. PATENT DOCUMENTS 7,478,535 B2 * 1/2009 Turner, Jr. ................ E03B 3/28
62/3.4
8,844,299 B2 * 9/2014 Ferreira .................... C02F 1/18
62/81

(Continued)

FOREIGN PATENT DOCUMENTS

CN        103205994 A  *  7/2013
CN        204343373 U  *  5/2015

*Primary Examiner* — Monica L Barlow
*Assistant Examiner* — Aaron M Rodziwicz
(74) *Attorney, Agent, or Firm* — Thrasher Associates

(57) ABSTRACT

Apparatuses and methods for collecting and irrigating water for plant growth in dry regions. Exemplary apparatus has appearance of a plant having leaves and stems, and operates same way plants grow and irrigate rain water and/or dew. Includes at least one water harvesting device for condensing moisture in air and collecting yield water. Device includes at least one device-body having a hydrophobic shell, and an internal-body-core surrounded by and enclosed within the hydrophobic shell; and plurality of condensation-protrusions disposed on the hydrophobic shell, each having internal-core and hydrophilic-shell surrounding and enclosing internal core. Device-body internal-body-core, in an integral manner, continuously extends to device-body hydrophobic shell and into (within) hydrophilic shell of each condensation-protrusion. When condensation-protrusions are cooler than moist air, hydrophilic-shell condenses and extracts moisture from air, becoming harvested water. When hydrophilic-shell is saturated, water flows on hydrophobic shell surface, and irrigates flowing water towards at least one target location.

20 Claims, 15 Drawing Sheets

(56) References Cited

U.S. PATENT DOCUMENTS

| | | | | |
|---|---|---|---|---|
| 10,632,416 | B2* | 4/2020 | Friesen | B01D 53/06 |
| 10,835,861 | B2* | 11/2020 | Friesen | B01D 53/0454 |
| 11,154,650 | B2* | 10/2021 | Robinson | A61F 13/0216 |
| 11,160,223 | B2* | 11/2021 | Friesen | A01G 18/60 |
| 2004/0000165 | A1* | 1/2004 | Max | E03B 3/28 |
| | | | | 62/615 |
| 2004/0173098 | A1* | 9/2004 | Callihan | E03B 3/28 |
| | | | | 96/108 |
| 2005/0044862 | A1* | 3/2005 | Vetrovec | B01D 53/265 |
| | | | | 62/93 |
| 2006/0112709 | A1* | 6/2006 | Boyle | B01D 5/0015 |
| | | | | 62/272 |
| 2008/0135495 | A1* | 6/2008 | Sher | E03B 3/28 |
| | | | | 95/117 |
| 2011/0247353 | A1* | 10/2011 | Metz | B01D 5/0039 |
| | | | | 417/334 |
| 2012/0036733 | A1* | 2/2012 | Dehn | B32B 27/12 |
| | | | | 442/325 |
| 2013/0227879 | A1* | 9/2013 | Lehky | B01D 53/28 |
| | | | | 96/240 |
| 2014/0138236 | A1* | 5/2014 | White | C02F 1/04 |
| | | | | 202/185.1 |
| 2014/0173769 | A1* | 6/2014 | Leyns | G01N 27/223 |
| | | | | 47/79 |
| 2016/0131401 | A1* | 5/2016 | Otanicar | C02F 1/14 |
| | | | | 62/3.3 |
| 2016/0333553 | A1* | 11/2016 | Dorfman | B01D 5/0006 |
| 2017/0354920 | A1* | 12/2017 | Switzer | B01D 53/0454 |
| 2018/0043295 | A1* | 2/2018 | Friesen | B01D 53/14 |
| 2019/0254243 | A1* | 8/2019 | Friesen | A01G 9/246 |

* cited by examiner

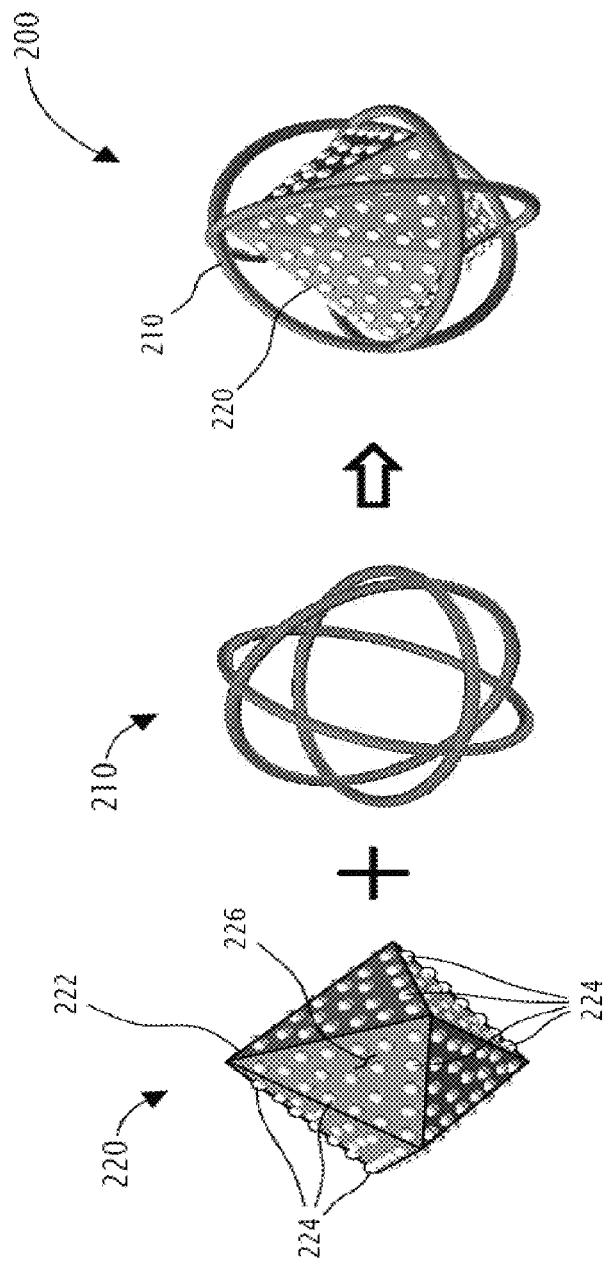

DEVICES AND METHODS FOR COLLECTING AND IRRIGATING WATER FOR PLANT GROWTH IN DRY REGIONS

FIELD OF THE INVENTION

The present invention relates to devices for generating forests in dry regions and more particularly, the present invention relates to devices and methods for generating forests in dry regions by extracting and collecting water from the air, and by irrigating the collected water. The present invention further provides methods for improving the soil fertility, wherein the irrigation method includes collecting and harvesting moisture from the air, as well as collecting and storing rainwater within the designated soil region for a prolonged period of time in order to supply water for plant growth.

BACKGROUND OF THE INVENTION

Deserts are characterized by lack of precipitation, a lot of sunshine, sand heat, cooling speed, creating extreme temperature difference between daytime and nighttime, and quick evaporation of water. When rain does fall, it often falls extensively for a short period of time, flowing in raging streams that quickly disappear with minimal contribution to the growth of plants. Such climate conditions prevent growth of plants such as trees and vegetation.

As a result of the Global Warming trend, future climate changes are anticipated. These changes may include an increase of global temperatures, rise of sea levels, changing precipitation regional patterns, and in particular expansion of deserts which are expected to expand towards the poles.

Some researchers suggested methods for planting in the desert region without irrigation (e.g. CN 1240570), or inventions such as desert plant irrigation (e.g. CN 204272851) and others, but thus far, it was either too expensive or not feasible.

There is therefore a need and it would be advantageous to provide means for growing plants in dry regions, by extracting and collecting water from the air, precipitation and flowing rivers, and by providing means for collecting and storing water, as well as irrigating the collecting water towards target plants.

SUMMARY OF THE INVENTION

The principal intentions of the present invention include providing devices and methods for growing trees and vegetation in dry regions, by extracting and collecting water from the air, in the form of dew, from precipitation and flowing rivers.

The present invention provides devices that harvest moisture from the air, as well as collect rainwater and stores it in the soil for a long period of time to supply the water timely and facilitate plant growth, including trees and forests.

In one embodiment there is provided an apparatus that has the appearance of a plant, having leaves and stems, in the same way that plants grow and irrigate rain water and/or dew. The external appearance of the device provides ecological mulching effect as well as enhancing the landscape function, thereby preventing irrigated water evaporation, preventing the rise of temperature on the soil, being the habitat of microorganisms and small animals, and reduces environmental adaptation stress of the planted young seedlings planted next to it.

Extendable leaf and branch structure for harvesting condensed water, further enables adjustment of the shaded area, thus providing the optimal planting environment suitable for the physiological characteristics of seedlings such as negative and positive sunshine.

It should be noted that the present invention is not limited to an imitation of plant structure and other irrigating structures may be used.

In some other embodiments of the invention, the device has a box like shape.

In yet other embodiments, the device may use one or more recycled PET bottles.

According to the teachings of the present invention, there is provided a water harvesting device for condensing moisture in the air and collecting the yield water. The device includes at least one device-body having a hydrophobic shell and an internal-body-core; and a plurality of condensation-protrusions disposed on the hydrophobic shell, wherein each condensation-protrusion includes an internal-core and a hydrophilic-shell.

In some embodiments, in the device-body, the internal-body-core is surrounded by and enclosed within the hydrophobic shell. In some embodiments, for each condensation-protrusion, the hydrophilic shell surrounds and encloses the internal core. In such embodiments, the device-body internal-body-core, in an integral manner, continuously extends to the device-body hydrophobic shell and into (within) the hydrophilic shell of each one of the condensation-protrusions.

When any of the condensation-protrusions is cooler than the moist air, condensation takes place and the hydrophilic-shell condenses and extracts the moist from the air, being the harvested water. When the hydrophilic-shell is saturated water flows on the surface of the hydrophobic shell, and wherein the hydrophobic shell is adapted to irrigate the flowing water towards at least one target location.

In exemplary embodiments, in the device-body, the internal-body-core is made of phase change material (PCM).

In exemplary embodiments, in each condensation-protrusion, the internal-core is made of PCM.

In some embodiments, the target location is a container.

In some embodiments, the water harvesting device further comprises a cage-spacer that holds the device-body, including the plurality of condensation-protrusions disposed thereon, in a manner that exposes the device-body, and the condensation-protrusions thereon, to air flow. In some embodiments, the cage-spacer is a wired frame configured around the device-body. In some embodiments, the water harvesting device is configured for being accommodated inside a bottle-like container. In some embodiments, the water harvesting device comprises a plurality of the at least one device-body.

In some embodiments, the water harvesting device comprises a plurality of the device-bodies, and has a net of wires structure. In some embodiments, the net of wires structure is wide open on the top side thereof, wherein the wires converge downwards towards one or more tips of the plurality of the device-bodies.

In some embodiments, the water harvesting device is configured for being accommodated inside a hogshead-like-container.

In some embodiments, the device-body is configured as a container with the internal-body-core having an opened top and an enclosed bottom. In some embodiments, the water harvesting device comprises a plurality of the device-bodies that are stacked up to form a standing array. In some embodiments, only the device-bodies of the standing array bottom row have enclosed bottoms, and the device-bodies of the standing array second row and up have opened bottoms.

According to further teachings of the present invention, there is provided a water harvesting and collecting apparatus for collecting and harvesting moisture from the air and collecting the yield condensed water. The apparatus includes at least one water harvesting device, as described here above, and an apparatus-irrigation subsystem. The apparatus-irrigation subsystem is configured to irrigate the flowing condensed water to flow towards the at least one target location.

The apparatus-irrigation subsystem includes apparatus-irrigation means for funneling the condensed water towards the at least one target location and a dropper irrigation unit. The dropper irrigation unit is at least partially penetrated into the ground. At least one of the at least one target location is situated below the ground surface. The irrigation means is configured to funnel the condensed water towards the at least one of the at least one target location via the dropper irrigation unit.

In some embodiments, the target location is a container disposed inside the dropper irrigation unit.

According to further teachings of the present invention, there is provided a water harvesting, irrigating and storing system for collecting and harvesting moisture from the air, as well as irrigating and storing the collected water to thereby facilitate plant growth. The system includes at least one water harvesting and collecting apparatus, as described here above, and an underground water storing and cultivating subsystem.

The underground water storing and cultivating subsystem includes a porous aggregate composed of inorganic or organic materials and an underground-irrigation subsystem. The porous aggregate is adapted to be placed inside a pothole formed at a selected ground location, and wherein the porous aggregate is configured to store collected water. The underground-irrigation subsystem is configured to irrigate the stored collected water towards a nearby planted plant.

The water harvesting, irrigating and storing system may further include an underground rechargeable fertilizer bucket containing a fertilizer, wherein the stored collected water is configured to draw the fertilizer before reaching the nearby planted plant.

In some embodiments, the inorganic or organic material is a straw bale.

In some embodiments, the container is disposed inside the straw bale.

In some embodiments, the water harvesting and collecting apparatus is shaped to imitate a tree-like structure that includes at least one hollow main stem unit, and at least one hollow stem-receiving-pipes protruding away from each of the at least one main stem unit.

The hollow space of each stem-receiving-pipe is a continuation of the hollow space of the main stem unit.

The at least one device-body includes at least one leaf or at least one multi-leaves-and-stems assembly, and wherein each at least one multi-leaves-and-stems assembly includes two or more leaves having small stems that are structurally interconnected with the open-ended stem of the multi-leaves-and-stems assembly.

Each leaf or at least one multi-leaves-and-stems assembly is configured to be inserted into a respective the stem-receiving-pipe.

The lowest the main stem unit is configured to operatively interface with the dropper irrigation unit, to thereby allowing condensed water, or collected rain water, to flow from each leaf or at least one multi-leaves-and-stems assembly into the respective stem-receiving-pipe, then inside the respective main stem unit, and from the lowest main stem unit to the dropper irrigation unit and then to the at least one target location.

According to further teachings of the present invention, there is provided a bottle-based water harvesting and collecting apparatus for collecting and harvesting moisture from the air and collecting the yield condensed water. The apparatus includes a multiplicity of water harvesting devices and a multiplicity of cage-spacers. Each cage-spacer fittingly embraces a respective water harvesting device, wherein the cage-spacer is configured to keep the condensation-protrusions of each multiplicity of water harvesting devices exposed to air flowing there around water harvesting devices.

The bottle-based apparatus further includes at least one bottle-like container configured to accommodate the caged water harvesting devices, the bottle-like container having an opening and a natural bottom at the opposing end of the bottle-like container, wherein the opening is configured to allow insertion of the caged water harvesting devices into the bottle-like container.

The bottle-based apparatus further includes an air-inlet-tube, a dropper irrigation unit and a cap interface unit.

The air-inlet-tube is in flow communication with cap-air-openings formed in the cap interface unit.

The bottle-air-openings are formed proximal to or at the natural bottom, to allow moist air entering the cap-air-openings, flow through the air-inlet-tube into the bottle-like container, and exit via the bottle-air-openings.

The dropper irrigation unit is operatively at least partially penetrated into the ground;

The at least one target location is situated below the ground surface.

The cap-interface-unit is configured to interface between bottle-like container and the dropper irrigation unit, wherein the opening of the bottle-like container is pointing downwards towards the ground, allowing the condensed water to flow from inside the bottle-like container to the dropper irrigation unit and then to the at least one target location; and wherein the flow of air inside the bottle-like container facilitates condensation of moist in the air by the exposed condensation-protrusions.

The water harvesting and collecting apparatus may further include at least one pipe-like shaped hollow main stem unit, wherein the main stem unit having hollow bottle-receiving-pipes protruding away from the main stem unit. The hollow space of each bottle-receiving-pipe is a continuation of the hollow space of main stem unit. Each of the bottle-receiving-pipe is configured to interface with one of the at least one bottle-like containers.

An electric or wind-operated fan may be disposed proximal to or at the natural bottom, to thereby increase the upward flow of the moist air inside the bottle-like container.

According to further teachings of the present invention, there is provided a bottle-based water harvesting, irrigating and storing system for collecting and harvesting moisture from the air, as well as irrigating and storing the collected water to thereby facilitate plant growth. The bottle-based system includes at least one bottle-based water harvesting and collecting apparatus, and an underground water storing and cultivating subsystem.

The underground water storing and cultivating subsystem includes a porous aggregate composed of inorganic or organic materials and an underground-irrigation subsystem. The porous aggregate is adapted to be placed inside a pothole formed at a selected ground location, and wherein the porous aggregate is configured to store collected water. The underground-irrigation subsystem is configured to irrigate the stored collected water towards a nearby planted plant.

The bottle-based water harvesting, irrigating and storing system may further include an underground rechargeable fertilizer bucket containing a fertilizer, wherein the stored collected water is configured to draw the fertilizer before reaching the nearby planted plant.

In some embodiments, the inorganic or organic material is a straw bale.

In some embodiments, the container is disposed inside the straw bale.

According to further teachings of the present invention, there is provided a water harvesting and collecting apparatus for collecting rain water and for harvesting moisture from the air and collecting the yield condensed water. The apparatus includes at least one device-body, having a bowl-like structure net of wires, and a hogshead-like-container.

The wide-open top of the bowl-like at least one device-body is facing upwards and the tip of the bowl-like at least one device-body is pointing downwards, towards the bottom of the hogshead-like-container. The hogshead-like-container is configured to accommodate the at least one device-body, the hogshead-like-container having an upper rim and an enclosed bottom. A first water-harvesting-device is mounted inside the hogshead-like-container proximal to an upper rim of the water-harvesting-device. In some embodiments, at least one additional water-harvesting-device may be mounted below the first water-harvesting-device, closer to an enclosed bottom of the hogshead-like-container.

According to further teachings of the present invention, there is provided a water harvesting and collecting apparatus for collecting rain water and for harvesting moisture from the air and collecting the yield condensed water, the apparatus including at least one water harvesting device, wherein the at least one device-body has a container like structure.

An upper open end of the at least one device-body is facing upwards and the enclosed bottom end of the at least one device-body is facing downwards.

The inner surface of the at least one device-body has a hydrophilic shell, wherein the plurality of condensation-protrusions is disposed on the inner surface of the at least one device-body. The condensation-protrusions are configured to condense moisture from the ambient air, wherein the dew droplets formed on the plurality of saturated hydrophilic-shells of condensation-protrusions, are collected by the gravity inside the water-harvesting-device.

In some embodiments, a plurality of the water-harvesting-devices are stacked up to form a standing array of the water-harvesting-devices, and wherein only the bottom row of the water-harvesting-devices have an enclosed bottom.

According to further teachings of the present invention, there is provided a plant growing method including the steps of:
a) a soil cultivating stage, including the steps of:
  i) providing any of the described above water harvesting, irrigating and storing systems,
    wherein the internal-body-core and the internal-core are made of PCM;
    wherein a container is disposed inside the dropper irrigation unit;
    wherein the water harvesting and collecting apparatus further includes an underground rechargeable fertilizer bucket containing a fertilizer; and
    wherein the store collected water is configured to draw the fertilizer before reaching the nearby planted plant;
  ii) selecting a designated planting location;
  iii) placing the porous aggregate inside a pothole formed at the designated planting location;
  iv) inserting the dropper irrigation unit into the porous aggregate;
  v) allowing a preconfigured cultivating time to lapse; and
b) a plant growing stage, including the steps of:
  i) removing the dropper irrigation unit from the porous aggregate;
  ii) planting a young seedling at the designated planting location;
  iii) selecting a new location near the designated planting location;
  iv) placing a water harvesting, irrigating and storing system, as in any of the described above water harvesting, irrigating and storing systems, at said new location; and
  v) placing the underground-irrigation subsystem configured to irrigate the store collected water from the water harvesting, irrigating and storing system towards the young seedling.

In some embodiments, the plant growing method further includes a step of placing a new porous aggregate inside a pothole formed at the new location, before the placing the water harvesting, irrigating and storing system at the new location.

BRIEF DESCRIPTION OF THE DRAWINGS

The present invention will become fully understood from the detailed description given herein below and the accompanying drawings, which are given by way of illustration and example only and thus not limitative of the present invention, and wherein:

FIG. 8a illustrates an example dew-condensation unit having a polygonal body, according to some embodiments of the present invention.

FIG. 8b is an example cage-spacer, suitable to keep the faces of the polygonal body shown in FIG. 8a.

FIG. 8c illustrates the dew-condensation device formed by the assembled dew-condensation unit and cage-spacer shown in FIGS. 8a and 8b.

FIG. 8e is an example cage-spacer, suitable to keep the faces of the polygonal body shown in FIG. 8a.

DETAILED DESCRIPTION OF THE INVENTION

Figure 1:
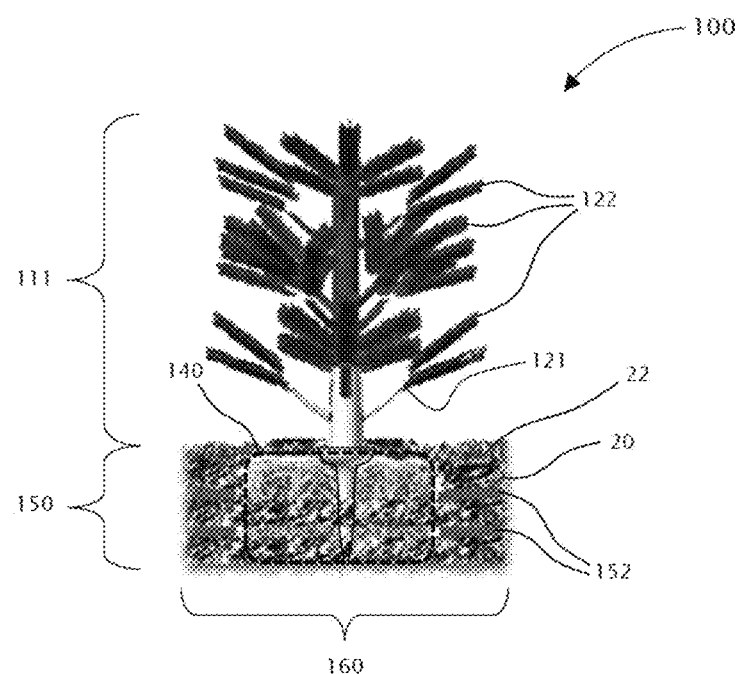
FIG. 1 illustrates an example system for collecting and harvesting moisture from the air, as well as irrigating the collected water to thereby facilitate plant growth, according to embodiments of the present invention.

The present invention relates to apparatuses and methods for generating forests in dry regions and more particularly, the present invention relates to apparatuses and methods based on extracting and collecting water from the air, and irrigating the collected water. In some embodiments, the present invention provides methods for improving soil fertility, wherein the irrigation method includes collecting and harvesting moisture from the air, as well as collecting and storing rainwater within a designated soil region for a prolonged period of time in order to supply water for plant growth.

An exemplary apparatus has the appearance of a plant having leaves and stems, and operates the same way that plants grow and irrigate rain water and/or dew. In some embodiments, the apparatus includes at least one water harvesting device for condensing moisture in air and collecting yield water via the condenses moisture. In some embodiments, the water harvesting device includes: a) at least one device-body having a hydrophobic shell, and an internal-body-core (for example, that includes phase change material (PCM)) surrounded by and enclosed within the hydrophobic shell; and b) a plurality of condensation-protrusions disposed on the hydrophobic shell, wherein each condensation-protrusion includes an internal-core (for example, that also includes the phase change material (PCM)) and a hydrophilic-shell surrounding and enclosing the internal core. The device-body internal-body-core, in an integral manner, continuously extends to the device-body hydrophobic shell and into (within) the hydrophilic shell of each condensation-protrusion. When condensation-protrusions are cooler than moist air, condensation occurs, and the hydrophilic-shell condenses and extracts moisture from air, becoming harvested water. When the hydrophilic-shell is saturated, water flows on the surface of the hydrophobic shell, so as to irrigate flowing water towards at least one target location.

The present invention will now be described more fully hereinafter with reference to the accompanying drawings, in which several exemplary embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

An embodiment is an example or implementation of the inventions. The various appearances of "one embodiment," "an embodiment" or "some embodiments" do not necessarily all refer to the same embodiment. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. It is understood that the phraseology and terminology employed herein are not to be construed as limiting and are for descriptive purpose only.

Meanings of technical and scientific terms used herein are to be commonly understood as to which the invention belongs, unless otherwise defined. The present invention can be implemented in the testing or practice with methods and materials equivalent or similar to those described herein.

It should be noted that orientation related descriptions such as "bottom", "up" "upper", "down", "lower", "top" and the like, assumes that the surface of the ground is generally horizontal and that a tree grows vertically with respect to the surface of the ground.

Reference is made to the drawings. FIG. 1 illustrates an example of water harvesting, irrigating and storing system 100 for collecting and harvesting moisture from the air, as well as irrigating and storing the collected water to thereby facilitate plant growth, according to embodiments of the present invention. Water harvesting, irrigating and storing system 100 includes a water harvesting and collecting apparatus 110 for collecting and harvesting moisture from the air, and an underground water storing and cultivating subsystem 150 for storing the collected water and cultivating the designated soil 20. Water harvesting and collecting apparatus 110 includes aboveground water harvesting section 111 and a dropper irrigation unit 118 that is part of the underground water storing and cultivating subsystem 150.

Figure 2A:
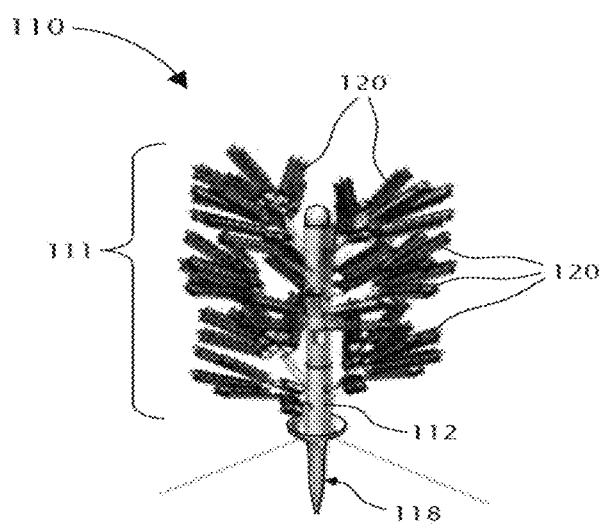
FIG. 2a illustrates an example device for collecting and harvesting moisture from the air, as well as irrigating the collected water to a designated ground region, according to embodiments of the present invention.
Figure 2B:
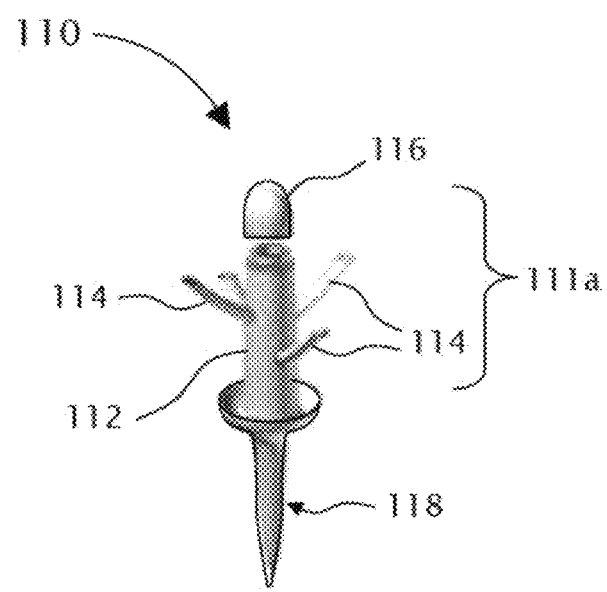
FIG. 2b illustrates the aboveground water harvesting section of the water harvesting device, having one hollow main stem unit.
Figure 2C:
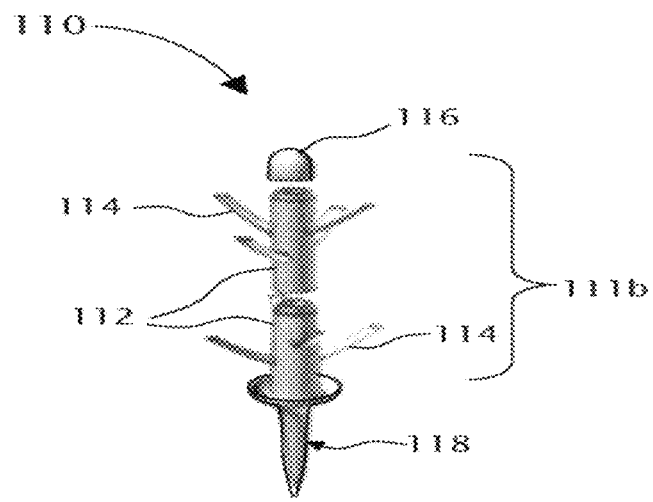
FIG. 2c illustrates the aboveground water harvesting section of the water harvesting device, having two hollow main stem units.

FIG. 2a illustrates the example water harvesting device 110 for collecting and harvesting moisture from the air, as well as irrigating the collected water to a designated ground region. The aboveground water harvesting section 111 of water harvesting and collecting apparatus 110 includes at least one pipe like shaped, hollow main stem unit 112, having one or more hollow stem-receiving-pipes 114 protruding away from main stem unit 112, wherein the hollow space of each stem-receiving-pipe 114 is a continuation of the hollow space of main stem unit 112. While FIG. 2b illustrates aboveground water harvesting section 111 having one hollow main stem unit 112, FIG. 2c illustrates an example aboveground water harvesting section 111 having two hollow main stem units 112. A cap 116 may enclose the upper hollow main stem unit 112.

The underground water storing and cultivating subsystem 150 of water harvesting and collecting apparatus 110 includes dropper irrigation unit 118 and underground irrigation system 152, configured to funnel collected water towards a reservoir for storing collected condensed water, situated below the surface 22 of a designated soil region 20.

FIG. 2a illustrates aboveground water harvesting section 111 of water harvesting and collecting apparatus 110 further includes a multi-leaves-and-stems assembly 120, each inserted into a respective stem-receiving-pipe 114. Thereby, in this example, aboveground water harvesting section 111 has the appearance of a plant with multi-leaves-and-stems assembly 120 in the same way as real plants grow, with a similar irrigating structure, thereby increasing the yield of the collected water.

Figure 3:
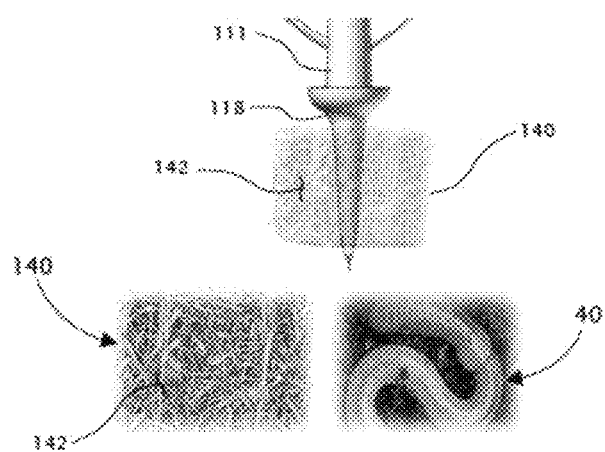
FIG. 3 is an illustration of elements of the underground water storing and cultivating subsystem.

FIG. 3 illustrates elements of the underground water storing and cultivating subsystem 150. Underground water storing and cultivating subsystem 150 includes a porous aggregate 140 composed of inorganic or organic materials such as, with no limitations, straw bale 142, wherein porous aggregate 140 is placed inside a pothole formed at a selected ground location, such that at least the majority of porous aggregate 140 is operatively situated below the ground surface 22. Porous aggregate 140 is configured to store collected water from either aboveground water harvesting and collecting apparatus 110 or other sources such as rain water. Collected water may be further stored in a tank reservoir, for example, inside each hollow main stem unit 112, or any other container.

Water harvesting, irrigating and storing system 100 may include a reservoir for storing condensed water and a space for storing liquid or solid fertilizer for plant and microorganisms. Water that exceeds the internal container overflows to the lower part dropper irrigation unit 118 and absorbed into the porous aggregate 140, and gradually stores the moisture into the deep soil 20 surrounding porous aggregate 140. The porous organic structure 142 of porous aggregate 140 is also capable of providing microorganisms and small animals 40 in soil 20 with nutrients and habitat at the same time. It is possible to simultaneously provide nutrients through an inner rechargeable nutrient supply to the plant with the necessary water and nutrients throughout the year, as well as moisture and space necessary for such microorganisms and small animals 40 to thereby enrich soil 20 and thereby provide better plant growth conditions. The water that is irrigated to the planting plant through the inner rechargeable nutrient supply the plant with the necessary water and nutrients.

Dropper irrigation unit 118 is operatively stuck into porous aggregate 140 such that the water collected by is funneled towards porous aggregate 140 serving as a reservoir for storing collected condensed water, which porous aggregate 140 is situated below the surface 22 of a designated soil region 20.

Furthermore, when a flood or rainfall occur, the rainwater riding on the outer surfaces of the multi-leaves-and-stems assembly 120 is collected directly and irrigated towards porous aggregate 140, to be absorbed into soil 20 through the underground porous structure composed of organic materials 142.

The organic material 142 absorbs and retains the water within a short period of time and slowly releases the water. The porous aggregate 140 further enables the moisture to be stored deeply within soil 20.

Moisture in the air and rainwater are collected through the multi-leaves-and-stems assembly 120 of the aboveground water harvesting section 111.

The water harvesting and collecting apparatus 110 may be shaped in various designs including designs that imitate various types of plant designs depending on the characteristics of the planting area. plants are typically shaped to provide efficient water irrigation towards the roots of the plant. Water that exceed the capacity of porous aggregate 140 is absorbed and gradually waters the deep soil 20 by way of capillary action.

The multi-leaves-and-stems assembly 120 is constructed of a plurality of leaves 122 and individual small stems that are structurally interconnected with stems 121 (see FIG. 1) of said multi-leaves-and-stems assembly 120 that is configured to be inserted into a respective stem-receiving-pipe 114 to thereby irrigate water that has been collected by the respective leaf 122 into that stem-receiving-pipe 114.

Figure 4A:
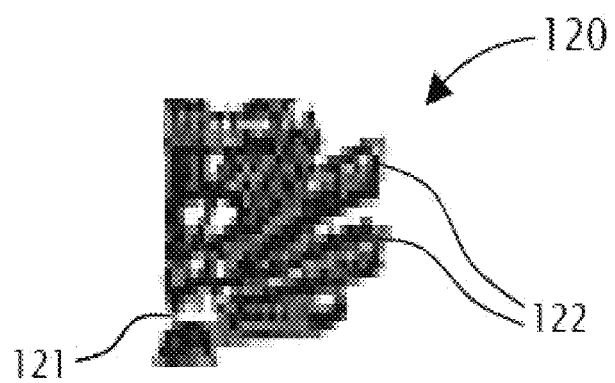
FIG. 4a illustrates a portion of the multi-leaves-and-stems assembly having individual leaf devices, each having an irrigating stem, according to some embodiments of the present invention.
Figure 4B:
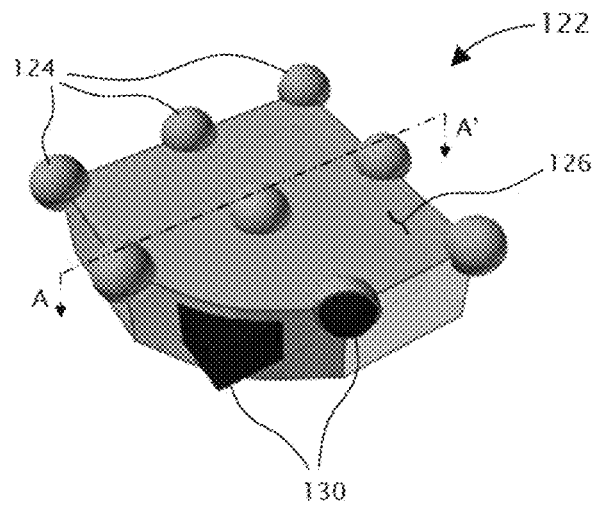
FIG. 4b illustrates a detailed segment of a leaf device.
Figure 4C:
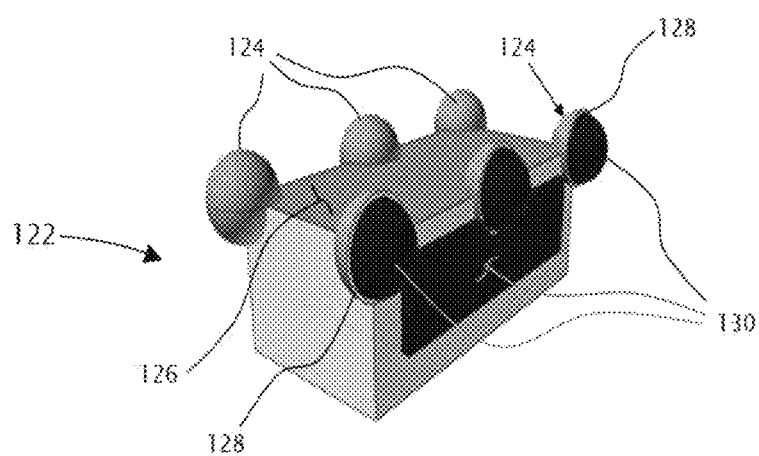
FIG. 4c illustrates a cross-section AA' of the segment of a leaf device shown in FIG. 4b.

With reference to FIGS. 4a, 4b, and 4c, according to some embodiments of the invention, there is provided a water harvesting device (for example, indicated by 122), for condensing moisture in the air and collecting the yield water. The device 122 includes at least one device-body having a hydrophobic shell 126 and an internal-body-core 130 (for example, that includes phase change material (PCM)); and a plurality of condensation-protrusions 124 disposed on the hydrophobic shell 126, wherein each condensation-protrusion 124 includes an internal-core (being a portion of 130, and also including phase change material (PCM)) and a hydrophilic-shell 128.

In some embodiments, in the device-body, the internal-body-core 130 is surrounded by and enclosed within the hydrophobic shell 126, and for each condensation-protrusion 124, the hydrophilic-shell 128 surrounds and encloses the internal core (portion of 130) thereof. In such embodiments, the device-body internal-body-core 130 (for example, that includes phase change material (PCM)), in an integral manner, continuously extends to the device-body hydrophobic shell 126 and into (within) the hydrophilic-shell 128 of each one of the condensation-protrusions 124. Such particular structural configuration of the device 122, and components thereof, facilitates highly efficient utilization of the phase change material (PCM), thereby, translating to highly efficient utilization of the device 122 for condensing moisture from the air and irrigating the captured water.

For example, FIG. 4*a* illustrates a portion of multi-leaves-and-stems assembly 120 having individual leaf (water harvesting) devices 122 each having an irrigating stem 121, according to some embodiments of the present invention. FIG. 4*b* illustrates a detailed segment of a leaf (water harvesting) device 122, and FIG. 4*c* illustrates a cross-section AA' of that segment of a leaf (water harvesting) device 122.

The external leaf-shell 126 of each leaf 122 is made of hydrophobic material wherein a plurality of condensation-protrusions 124 is disposed onto the external leaf-shell 126 of the leaves 122, wherein each condensation-protrusion 124 has a hydrophilic-shell 128. The internal body 130 of each leaf 122 is made of a phase change material (PCM) to thereby continuously cool the condensation-protrusions 124. The internal-body-core 130 of each leaf 122 may be continuous, that is, extending proximal to the external leaf-shell 126 as well as to the hydrophilic-shell 128. The temperature of the PCM material is preconfigured to maintain a temperature that is cooler than the temperature for many daily hours and transfer that temperature to hydrophilic-shell 128, and therefore the thickness of the hydrophilic-shells 128 is relatively thin.

Hence, hydrophilic-shell 128 of the condensation-protrusion 124 are continuously cooled by the PCM (phase change from solid to liquid and vice versa) internal body 130 due to the rise of the morning ambient temperatures with respect to the chilly night temperatures, which is typically more so in dry regions such as deserts. As a result of the colder hydrophilic-shell 128, constant condensation of the water from the air takes place.

Figure 5:
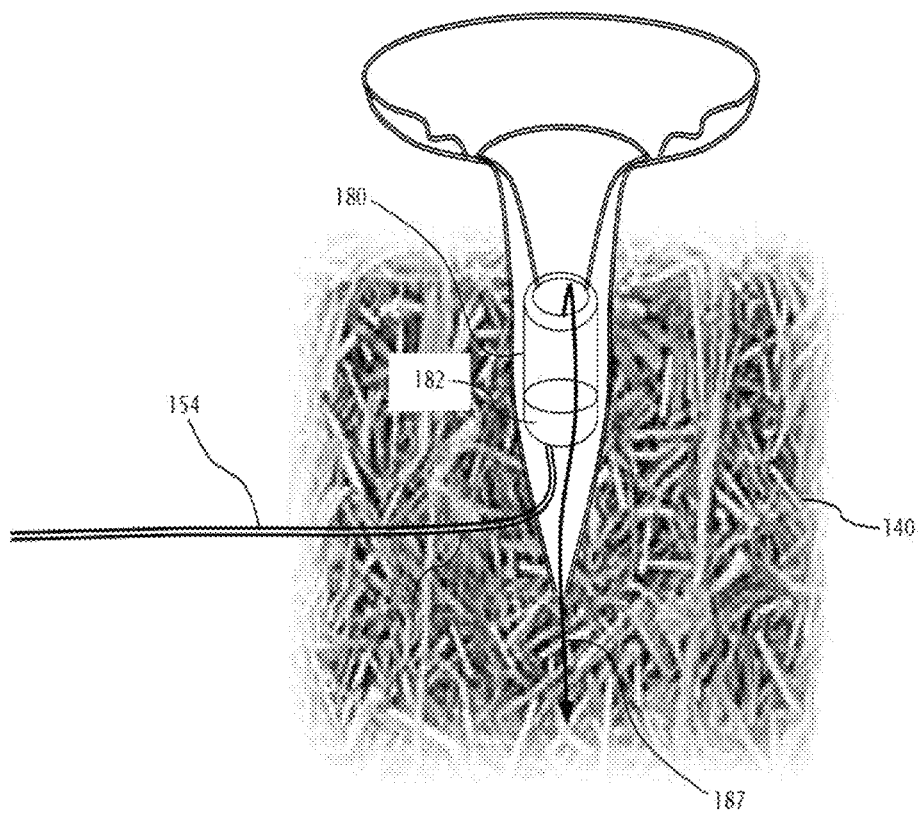
FIG. 5 illustrates an example supply container disposed inside the dropper irrigation unit, shown in a sectioned view.

Continuous dew formation is maintained by keeping the temperature of the surface of the shells (126, 128) below the dew point for a long period of time (natural condensation and PCM-based condensation apply both) by capturing a large amount of PCM in condensation-protrusions 124 as well as the underlying structure. The dew droplets formed on the plurality of saturated hydrophilic-shells 128, are collected by the gravity along the hydrophobic surface 126 into stem-receiving-pipe 114 and flown towards, and stored in a supply container inside the body structure, for example inside aboveground water harvesting device 110, dropper irrigation unit 118 and porous aggregate 140, and from there the collected water is irrigated to the planted plant. FIG. 5 illustrates, in a sectioned view, an example supply container 180 disposed inside dropper irrigation unit 118. Example supply container 180 is configured to collect the water arriving from aboveground water harvesting device 110. In exemplary embodiments, supply container 180 includes a rechargeable fertilizer bucket 182, providing microorganisms and small animals 40 to soil 20 below. When supply container 180 is filled up, overflowing water flows (187) through porous aggregate 140 stored in the soil 20 below. At least one hose 154 is directed towards the planted plant to provide a supply of a daily amount of water required for proper growth of the planted plant.

PCM materials 130 used are selected to adapt to the weather conditions in which the water harvesting, irrigating and storing system 100 of the present invention is used. The following are examples, with no limitations, of PCM materials 130 that may be used:

Example 1: PCM Material is Water

| | |
|---|---|
| Solidification temperature | 0° C. |
| Melting temperature | 0° C. |

Examples of Suitable Conditions:

| | |
|---|---|
| Day time temperature | >5° C. |
| Day time PCM phase | liquid |
| Night time temperature | <−3° C. |
| Night time PCM phase | solid |
| Morning PCM phase | changing from solid to liquid as temp' rises, dew is forming while melting takes place. |

Example 2: PCM Material is Paraffin 14-Carbons

| | |
|---|---|
| Solidification temperature | 5.5° C. |
| Melting temperature | 5.5° C. |

Examples of Suitable Conditions:

| | |
|---|---|
| Day time temperature | >10° C. |
| Day time PCM phase | liquid |
| Night time temperature | <4° C. |
| Night time PCM phase | solid |
| Morning PCM phase | changing from solid to liquid as temp' rises, dew is forming while melting takes place. |

Example 3: PCM Material is Paraffin 15-Carbons

| | |
|---|---|
| Solidification temperature | 10° C. |
| Melting temperature | 10° C. |

Examples of Suitable Conditions:

| | |
|---|---|
| Day time temperature | >15° C. |
| Day time PCM phase | liquid |
| Night time temperature | <8° C. |
| Night time PCM phase | solid |
| Morning PCM phase | changing from solid to liquid as temp' rises, dew is forming while melting takes place. |

It is an aspect of the present invention to provide a cultivation method that includes two main stages. The process may start with preparing the soil for planting. In exemplary embodiments, initially, a field is chosen, prepared and bordered like any other field for regular agriculture planting. Once the field is prepared for planting, the first stage begins.

Figure 6:
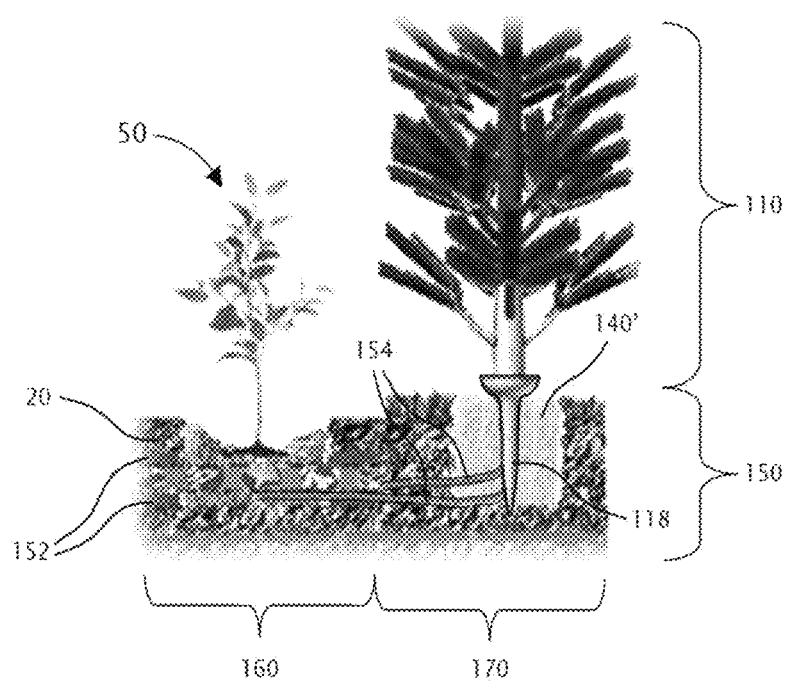
FIG. 6 illustrates the second stage of cultivating a young seedling, in which stage the water harvesting, irrigating and storing system is rearranged to cultivate the young seedling.

In the first stage, as illustrated in FIG. 1, the water harvesting, irrigating and storing system 100 is installed in the designated planting area 160 to raise the fertility of the soil 20 to provide a better plant growing environment. In the second stage, as illustrated in FIG. 6, the aboveground water harvesting device 110 and including dropper 118 are removed and a young seedling 50 that is planted there instead.

The aboveground water harvesting section 111 water harvesting device 110 and dropper 118 of water harvesting, irrigating and storing system 100 are moved to a nearby supporting-region 170, in order to support the planted young seedling 50 that is planted at the original designated planting area 160, where the location of the aboveground water harvesting section 111 water harvesting device 110 of and dropper 118 were installed in the first stage. The water harvesting, irrigating and storing system 100 now provides water, via dropper 118 and an underground irrigation subsystem, including, for example, by way of hoses 154 to the planted young seedling 50, as well as to the microorganisms and small animals 40 in soil 20. As the planted young seedling 50 grows older, more water harvesting, irrigating and storing systems 100 may be installed to support the growing needs of the grown seedling 50. Alternatively, or in addition, the aboveground water harvesting device 110 may be extended by adding more main stem units 112, including stem-receiving-pipes 114 multi-leaves-and-stems assembly 120.

Dropper 118 may further provide water to a new porous aggregate 140' placed inside a pothole formed at the nearby supporting-region 170, to cultivate a stage one new location for another young seedling 50, including providing microorganisms and small animals 40 in soil 20 with nutrients and habitat at the same time.

It should be noted that the external appearance of the device provides ecological mulching effect as well as enhancing the landscape function, thereby preventing irrigated water evaporation, preventing the rise of temperature of the soil and the lower part of the device. The preventing of high temperature of the soil, which is the habitat of microorganisms and small animals, reduces environmental adaptation stress of the planted young seedlings.

It should be further noted that the extendable leaf and branch structure for water yield adjustment enables adjustment of the shade area (adjustment of the amount of sunshine), thus providing the optimal planting environment suitable for the physiological characteristics of seedlings such as negative and positive sunshine.

It should be further noted that the method of generating forests in dry regions by extracting and collecting water from the air is performed in stages, as described hereabove.

In another embodiment of the invention (suitable, for example, for undeveloped countries), the water harvesting device 110 is replaced by a condensation-container filled with dew-condensation units, wherein conditions are formed for air containing moisture to flow inside the condensation-container, facilitating harvesting water from the air by the dew condensation units.

Figure 7C:
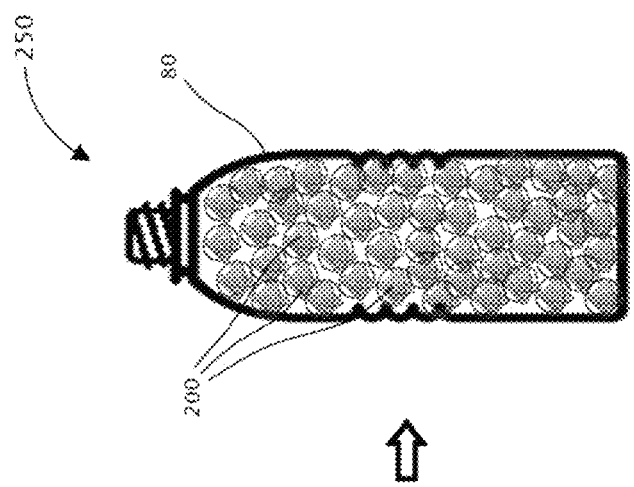
FIG. 7c shows the PET bottle filled with the dew-condensation devices, forming together a water harvesting device.
Figure 7B:
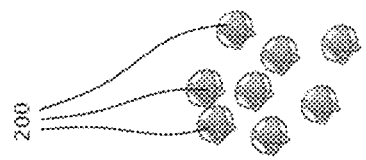
FIG. 7b illustrates examples of dew-condensation devices, according to some embodiments of the present invention.
Figure 7A:
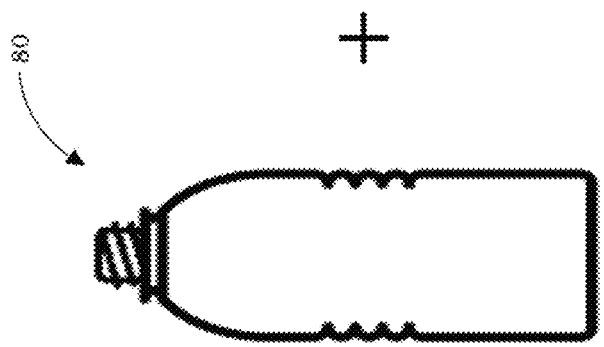
FIG. 7a illustrates an example recycled PET bottle designated to serve as a capsules-container.

In one embodiment, capsules-container is a recycled PET bottle such as, with no limitation, a disposable beverage bottle 80, as illustrated in FIG. 7a. Example dew condensation devices 200 are shown in FIG. 7b, and FIG. 7c shows PET bottle 80 filled with dew-condensation devices 200, forming together a water harvesting device 250.

FIG. 8a illustrates an example dew-condensation unit 220 having a polygonal body 222, wherein the external shell 226 of each face of polygonal body 222 is made of hydrophobic material, wherein a plurality of condensation-protrusions 224 is disposed on the external dew-condensation-unit-shell 226, and wherein each hydrophilic-protrusion 224 has a hydrophilic-shell. The inside of polygonal body 222 is made of a phase change material (PCM) to thereby continuously cool the condensation-protrusions 224. The inside of polygonal body 222 may be continuous, that is, extending proximal to the external dew-condensation-unit-shell 226 as well as to the hydrophilic-shell. The temperature of the PCM material is preconfigured to maintain a temperature that is cooler than the temperature for many daily hours and transfer that temperature to the hydrophilic-shell, and therefore the thickness of the hydrophilic-shells is relatively thin.

In some embodiments, in polygonal body 222, the internal-body-core (same as, or similar to, internal-body-core 130 of the device 122 shown in FIGS. 4a-4c, for example, including phase change material (PCM)) is surrounded by and enclosed within the hydrophobic shell 226, and for each condensation-protrusion 224, a hydrophilic-shell (same as, or similar to, hydrophilic-shell 128 of condensation-protrusions 124 shown in FIGS. 4a-4c) surrounds and encloses an internal core thereof (for example, that also includes phase change material (PCM)). In such embodiments, the internal-body-core, in an integral manner, continuously extends to the polygonal body hydrophobic shell 226 and into (within) the hydrophilic-shell of each one of the condensation-protrusions 224. Such particular structural configuration of polygonal body 222, and components thereof, facilitates highly efficient utilization of the phase change material (PCM), thereby, translating to highly efficient utilization of polygonal body 222 for condensing moisture from the air and irrigating the captured water.

Hence, hydrophilic-shell of the condensation-protrusions 224 are continuously cooled by the PCM inside of polygonal body 222 due to the rise of the morning ambient temperatures with respect to the chilly night temperatures, which is typically more so in dry regions such as deserts. As a result of the colder hydrophilic-shell, constant condensation of the water from the air takes place. Continuous dew formation is maintained by keeping the temperature of the surface of the shells below the dew point for a long period of time (natural condensation and PCM-based condensation apply to both) by capturing a large amount of PCM in condensation-protrusions 224 as well as the underlying structure. The dew droplets formed on the plurality of saturated hydrophilic-shells, are collected by the gravity along the hydrophobic surface inside water harvesting device 250.

The PCM materials used are selected to adapt to the weather conditions in which the water harvesting device of the present invention is used.

To keep the majority of condensation-protrusions 224 exposed to the air flowing inside capsules-container 80, each hydrophilic capsule 220 is kept in a cage-spacer-like wired frame. FIG. 8b illustrates an example cage-spacer 210, suitable to keep the faces of polygonal body 222 and exposed to the air flowing inside capsules-container 80. The assembled dew-condensation unit 220 and cage-spacer 210, forming the dew-condensation device 200, is shown in FIG. 8c.

Figure 8F:
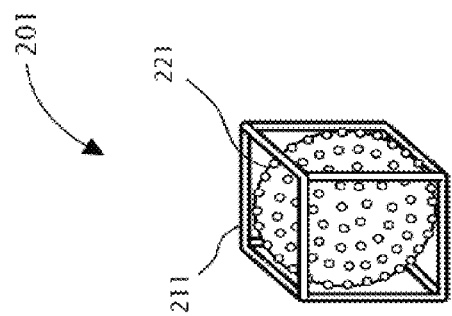
FIG. 8f illustrates the dew-condensation device formed by the assembled dew-condensation unit and cage-spacer shown in FIGS. 8d and 8e.

It should be noted that the shapes of the dew-condensation unit and respective cage-spacer are not limited to the shapes described hereabove, and other shape combinations may be used. Another example is illustrated in FIGS. 8d-8f FIG. 8d illustrates an example dew-condensation unit 221 having a spherical body 223, wherein the external dew-condensation-unit-shell 226 of spherical body 223 is made of hydrophobic material, wherein a plurality of condensation-protrusions 224 is disposed on the external dew-condensation-unit-shell 226, and wherein each condensation-protrusion 224 has a hydrophilic-shell (same as, or similar to, hydrophilic-shell 128 of condensation-protrusions 124 shown in FIGS. 4a-4c).

In some embodiments, in spherical body 223, the internal-body-core (same as, or similar to, internal-body-core 130 of the device 122 shown in FIGS. 4a-4c, for example, including phase change material (PCM)) is surrounded by and enclosed within the hydrophobic shell 226, and for each condensation-protrusion 224, a hydrophilic-shell (same as, or similar to, hydrophilic-shell 128 of condensation-protrusions 124 shown in FIGS. 4a-4c) surrounds and encloses an internal core thereof (for example, that also includes phase change material (PCM)). In such embodiments, the internal-body-core, in an integral manner, continuously extends to the spherical body hydrophobic shell 226 and into (within) the hydrophilic-shell of each one of the condensation-protrusions 224. Such particular structural configuration of spherical body 223, and components thereof, facilitates highly efficient utilization of the phase change material (PCM), thereby, translating to highly efficient utilization of spherical body 223 for condensing moisture from the air and irrigating the captured water.

Figure 8E:
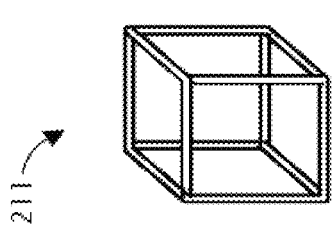
Figure 8D:
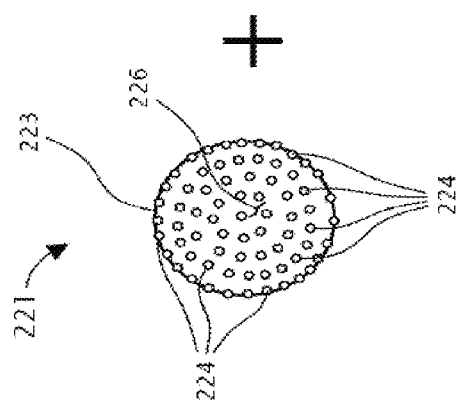
FIG. 8d illustrates an example dew-condensation unit having a polygonal body, according to some embodiments of the present invention.

FIG. 8e illustrates a cubical cage-spacer 211, suitable to keep the face of spherical body 223 exposed to the air flowing inside capsules-container 80. The assembled dew-condensation unit 221 and cage-spacer 211, forming dew-condensation device 201, is shown in FIG. 8f. It should be noted that, hereon, the descriptions related to the dew-condensation devices 200 also relate to the dew-condensation devices 201 and other dew-condensation devices with different shapes.

Figure 9:
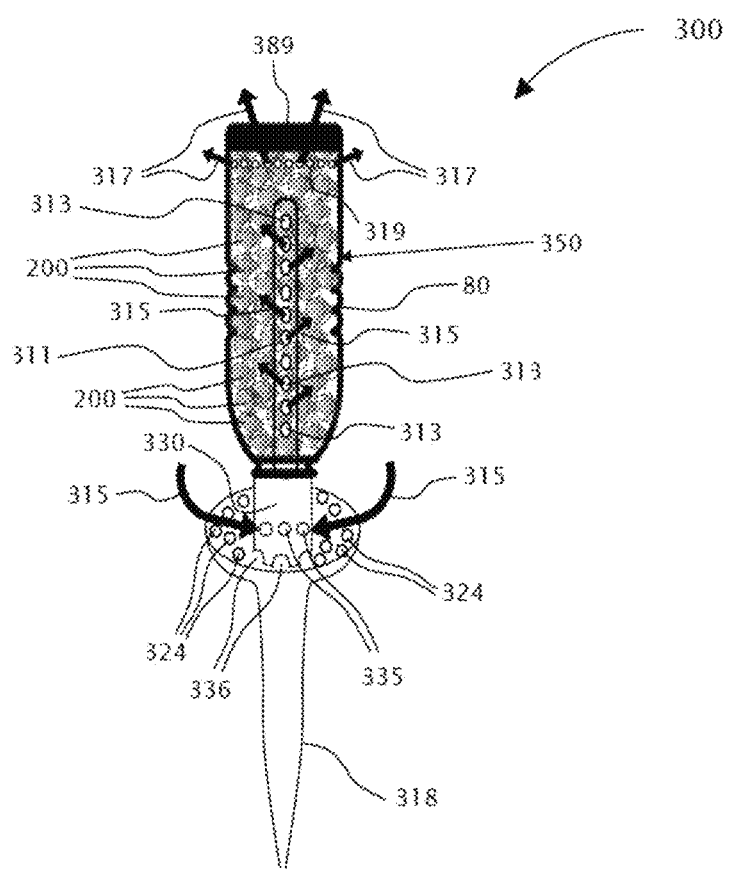
FIG. 9 illustrates another example of a water harvesting, irrigating and storing system for collecting and harvesting moisture from the air, as well as irrigating and storing the collected water to thereby facilitate plant growth, according to some embodiments of the present invention.

Reference is now made to FIG. 9, showing another example water harvesting and collecting apparatus 300 for collecting and harvesting moisture from the air, as well as irrigating and storing the collected water to thereby facilitate plant growth, according to some embodiments of the present invention. Water harvesting and collecting apparatus 300 includes a water-harvesting-assembly 350, a dropper irrigation unit 318 and a cap interface unit 330.

Water-harvesting-assembly 350 includes a capsules-container such as a recycled PET bottle 80, a plurality of dew-condensation devices 200 disposed inside recycled PET bottle 80, and an air-inlet-tube 311.

Cap-interface-unit 330 is configured to interface between water-harvesting-assembly 350 and dropper irrigation unit 318. Cap-air-openings 335 allow ambient air with moist to flow through air-inlet-tube 311 and into recycled PET bottle 80. Droplets-openings 336 are configured to allow water droplets, formed inside water-harvesting-assembly 350, to flow towards dropper irrigation unit 318.

Operationally, recycled PET bottle 80 is assembled upside down, wherein cap-interface-unit 330 faces the earth, such that the bottle's natural bottom is facing, towards the sky. Air-inlet-tube 311 is an elongated hollow tube, wherein multiple through openings 313 are formed in the walls of the tube. Air-inlet-tube 311 is in flow communication with cap-air-openings 335 and extends upwards towards the natural bottom of recycled PET bottle 80.

FIG. 9 also illustrates the air flow direction 315 inside water-harvesting-assembly 350 during condensation hours, typically morning hours and later. Air flow direction 315 is formed due to changing ambient temperatures and the temperature of the PCM during the change of phase. The air flows in direction 315 after entering cap-air-openings 335, from there into air-inlet-tube 311 exiting in direction 315 via the openings 313 formed in the walls of air-inlet-tube 311 and into the inner space of recycled PET bottle 80.

Inside recycled PET bottle 80, the moist air comes into contact with the dew-condensation units 220 which units begin to condensation process. The air continues to flow upwards towards the natural bottom 389 of recycled PET bottle 80, where the air flows (317) out of bottle-openings 319 formed proximal to or at the natural bottom 389 of recycled PET bottle 80.

To ensure the upward flow of air with moist inside water-harvesting-assembly 350 during water harvesting, the natural bottom 389 of recycled PET bottle 80 may be painted in black, to thereby warm the air at the upper section of recycled PET bottle 80.

Figure 11A:
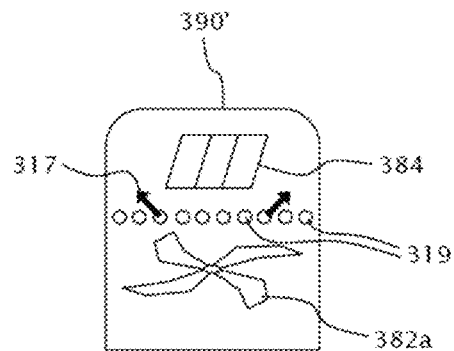
FIG. 11a is an exploded view illustration of another example of a cap having an electric fan to generate or enhance the flow of moist air inside a capsules-container of a dew-condensation device.
Figure 11B:
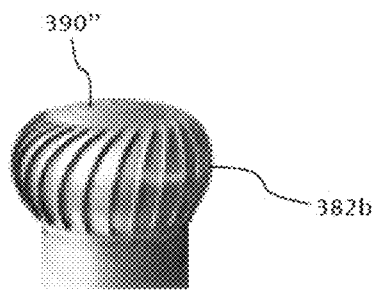
FIG. 11b is an exploded view illustration of another example of a cap having an electric fan to generate or enhance the flow of moist air inside a capsules-container of a dew-condensation device.

Optionally, the upward flow of air with moist inside water-harvesting-assembly 350 during water harvesting is ensured by using an electric fan 382 (see for example FIG. 11a and FIG. 11b) located proximal to or at the natural bottom 389 of recycled PET bottle 80. Optionally, electric fan 382 is operated by solar energy obtained from photovoltaic cells 384.

Figure 10:
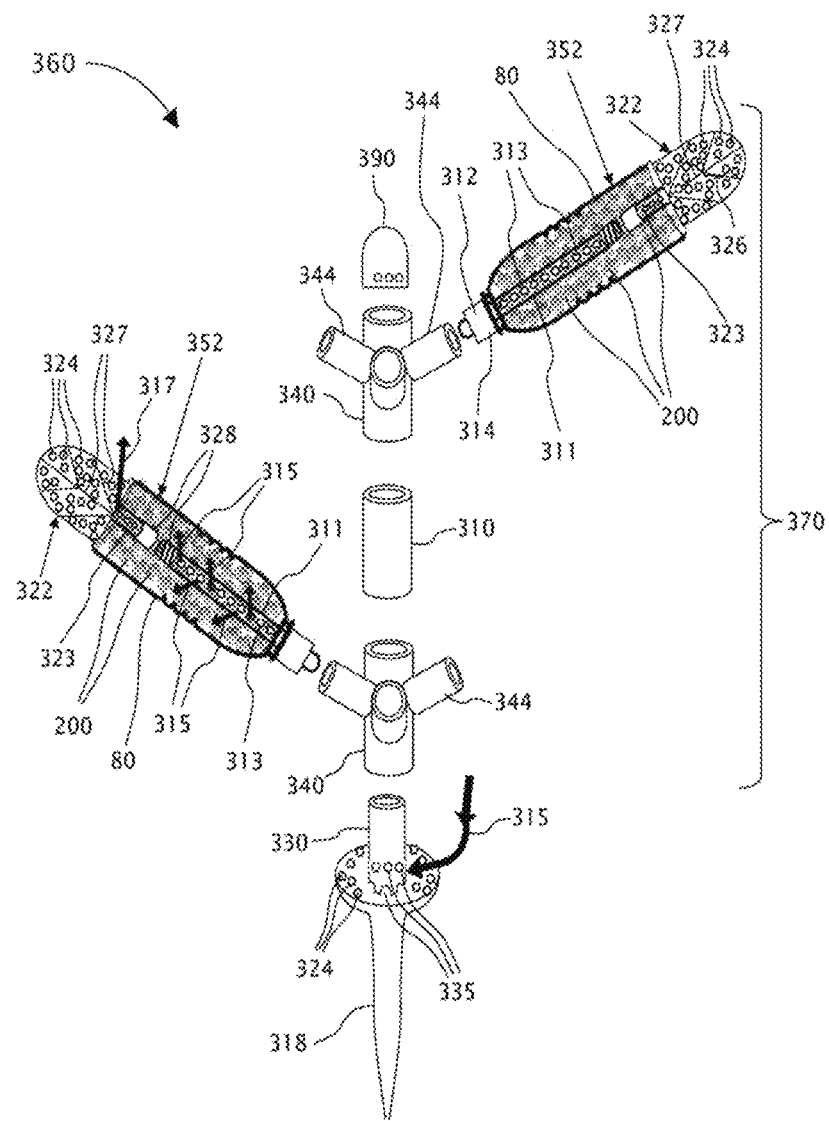
FIG. 10 is an exploded view illustration of another example of a water harvesting, irrigating and storing system, according to some embodiments of the present invention.

Referring to FIG. 10, another example of water harvesting, irrigating and storing system 360, according to some embodiments, is illustrated. Water harvesting and collecting apparatus 300 is configured to collect and harvest moisture from the air, as well as irrigating and storing the collected water to thereby facilitate plant growth.

Water harvesting, irrigating and storing system 360 includes an aboveground water harvesting device 370, a dropper irrigation unit 318 and a cap interface unit 330.

The aboveground water harvesting device 370 that includes at least one pipe like shaped, hollow main stem unit 340, having hollow bottle-receiving-pipes 344 protruding away from main stem unit 340, wherein the hollow space of each bottle-receiving-pipe 344 is a continuation of the hollow space of main stem unit 340. FIG. 10 illustrates, by way of example, an aboveground water harvesting device 370 having two hollow main stem units 340, interconnected by an interface-stem 310. A cap 330 may enclose the upper hollow main stem unit 340. Water harvesting device 370 further includes a dropper irrigation unit 318 and optionally, an underground irrigation system, similar to underground irrigation system 152. Water harvesting device 370 may by capped by a cap 390 that limits loss of moist air flowing there within.

The aboveground water harvesting device 370 further includes a water-harvesting-assembly 352 that operates similarly to water-harvesting-assembly 350. Water-harvesting-assembly 352 includes a capsules-container such as a recycled PET bottle 80, a plurality of dew-condensation devices 200 disposed inside recycled PET bottle 80, and an air-inlet-tube 311.

Cap-interface-unit 330 is configured to interface between water-harvesting-assembly 352 and dropper irrigation unit 318. Cap-air-openings 335 allow ambient air with moist to flow through air-inlet-tube 311 and into recycled PET bottle 80. Cap-air-openings 335 is further configured to allow water droplets formed inside water-harvesting-assembly 350 to flow towards dropper irrigation unit 318.

Figure 12:
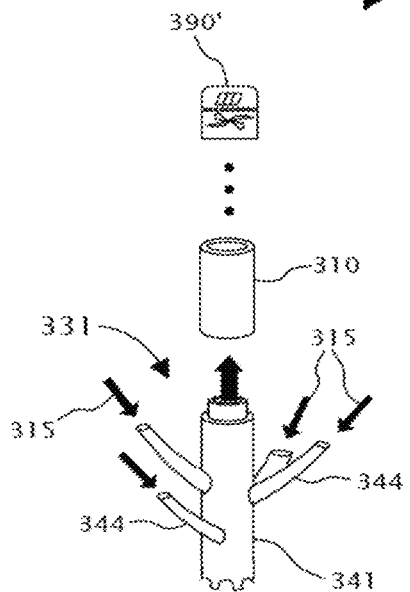
FIG. 12 illustrates a cap-interface-unit utilizing, for example, an electric fan to generate or enhance the flow of moist air inside a capsules-container of a dew-condensation device.

In another embodiment, shown in FIG. 12, a cap-interface-unit 331 replaces cap-interface-unit 330, providing the same function, that is, ambient air with moist to flow through air-inlet-tubes 344, through the hollow body of pipe 340 and optionally, via an interface-stem 310, towards one or more recycled PET bottles 80.

Operationally, recycled PET bottle 80 is assembled at least slightly upside down, facing the earth, such that the bottles in bottom are facing at least slightly upwards towards the sky. Air-inlet-tube 311 is an elongated hollow tube, wherein multiple through openings 313 are formed in the walls of the tube. Air-inlet-tube 311 secured to a respective hollow bottle-receiving-pipe 344 and extends upwards towards to natural bottom of recycled PET bottle 80.

Inside recycled PET bottle 80, the moist air comes into contact with the dew-condensation devices 200 which begin the condensation process. The air continues to flow upwards towards the natural bottom of recycled PET bottle 80, where the air flows out of the at least partially opened up natural bottom of recycled PET bottle 80.

Water-harvesting-assembly 352 further includes an external-water-harvesting-unit 322 that may be shaped, with no limitation, like a leaf. External-water-harvesting-unit 322 is built and functions like leaf 122, wherein the external shell 326 of external-water-harvesting-unit 322 resembles the external leaf-shell 126 of leaf 122, and the plurality of condensation-protrusions 324 resembles the plurality of condensation-protrusions 124.

External-water-harvesting-unit 322 further includes an attachments mechanism 328 for securing external-water-harvesting-unit 322 to water-harvesting-assembly 352, for example by attaching a first end of an extension-funneling-tube 323 to air-inlet-tube 311, wherein the second end of extension-funneling-tube 323 is secured to external-water-harvesting-unit 322.

External-water-harvesting-unit 322, having a PCM internal body, is configured to condense the moisture contained in the ambient air using condensation-protrusions 324, wherein the dew droplets formed on the plurality of saturated hydrophilic-shells of condensation-protrusions 324, are collected by the gravity along the hydrophobic surface of external shell 326 and flown via funnels 327 that receives natural dew and natural rainfall created from the outer part of external-water-harvesting-unit 322.

The air flow inside recycled PET bottle 80 of a water-harvesting-assembly (350, 352) is caused by the temperature difference between the ambient temperature outside PET bottle 80 the temperature inside PET bottle 80 affecting the PCM (for example, PCM 130).

At dawn time, air flow creates a phase change of the PCM, and in the morning air flow supplies moist air for continuous condensation. To create an active airflow 315, in a single PET bottle 350 configuration 300, a warm (for example, black color) natural bottom 389 may be used. In a multi-PET bottle configuration (360, 365) a cap (390' 390") having a fan 382 that may be powered by wind (382b) or electric power (382a), for example by photo voltaic cells, may be used during the condensation time to stimulate the air flow. Thereby, moist air can be continuously supplied, which moist air is required for condensation.

Figure 13:
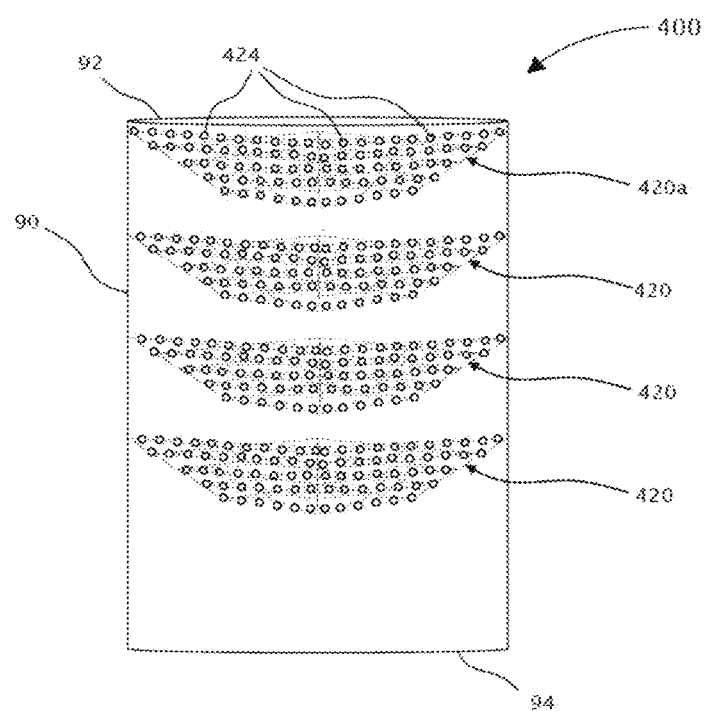
FIG. 13 illustrates another example water harvesting, irrigating and storing system, according to some embodiments of the present invention, including at least one wired water-harvesting-device.

Reference is now made to FIG. 13, showing yet another example water harvesting and collecting apparatus 400 for collecting rain water and for harvesting and collecting moisture from the air, as well as irrigating and storing the collected condensed water, according to some embodiments of the present invention. Water harvesting and collecting apparatus 400 includes at least one water-harvesting-device 420.

Figure 14A:
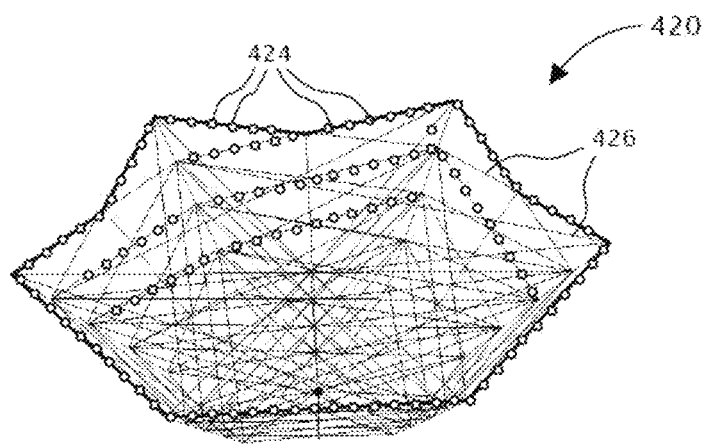
FIG. 14a is a perspective bird-eye view of the wired water-harvesting-device shown in FIG. 13.
Figure 14B:
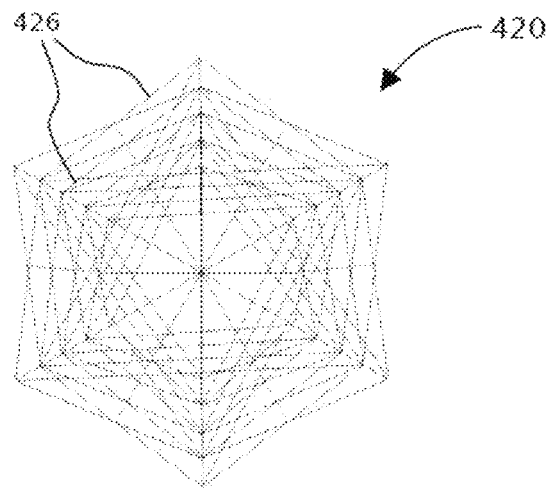
FIG. 14b is a top view of the wired water-harvesting-device shown in FIG. 13.
Figure 14C:
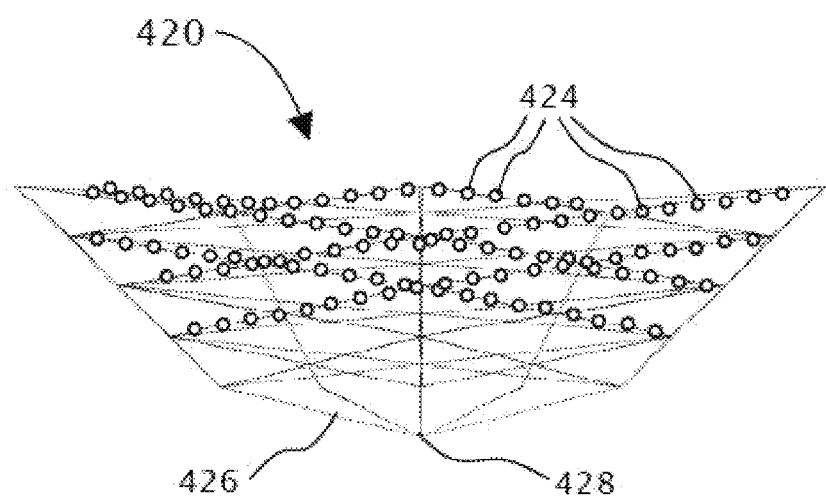
FIG. 14c is a side view of the wired water-harvesting-device shown in FIG. 13.

FIG. 14a is a perspective bird-eye view of water-harvesting-device 420; FIG. 14b is a top view of an example of the body of water-harvesting-device 420, having a net of wires structure; and FIG. 14c is a side view of water-harvesting-device 420. The net of wires structure of body of water-harvesting-device 420 is wide open on the top side, wherein the wires converge downwards towards one or more tips 428.

The wires have a PCM internal body and a hydrophobic external shell 426, wherein a plurality of condensation-protrusions 424, each having a PCM internal body and a hydrophilic shell (same as, or similar to, hydrophilic-shell 128 of condensation-protrusions 124 shown in FIGS. 4a-4c). Condensation-protrusions 424 are configured to condense moisture from the ambient air, using hydrophilic-protrusions 424, wherein the dew droplets formed on the plurality of saturated condensation-shells of condensation-protrusions 424, are collected by the gravity along the hydrophobic wires 426 and drop down the one or more tips 428.

Referring back to FIG. 13, several water-harvesting-devices 420 are mounted inside a hogshead-like-container 90 to form an example of water harvesting and collecting apparatus 400, wherein the condensed water is accumulated inside hogshead-like-container 90. Such embodiments are suitable, for example, for container designated to collect rain water. A first water-harvesting-device 420a is mounted inside hogshead-like-container 90 proximal to the upper rim 92 of water-harvesting-device 420. More water-harvesting-devices 420 may be mounted below first water-harvesting-device 420a, closer to the enclosed bottom 94 of hogshead-like-container 90.

Figure 15A:
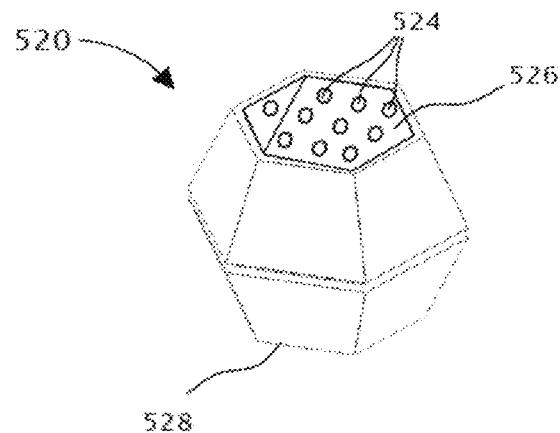
FIG. 15a illustrates yet another example water-harvesting-device, according to some embodiments of the present invention.
Figure 15B:
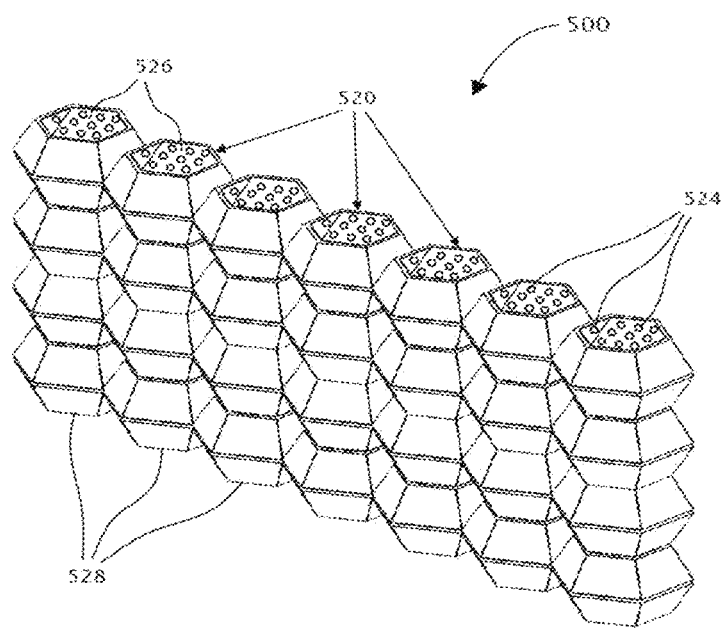
FIG. 15b illustrates yet another example of a water harvesting, irrigating and storing system, according to some embodiments of the present invention.

Reference is now made to FIG. 15a, showing yet another example of water-harvesting-device 520, and to FIG. 15b, showing yet another example of water harvesting and collecting apparatus 500 for collecting and harvesting moisture from the air, as well as irrigating and storing the collected water to thereby facilitate plant growth, according to some embodiments of the present invention. Water harvesting and collecting apparatus 500 includes at least one water-harvesting-device 520.

Each water-harvesting-device 520 has a body designed as a container having a PCM internal body having an opened top and an enclosed bottom 528, wherein the inner surface 526 is made of hydrophobic material, and wherein a plurality of condensation-protrusions 524, each having a PCM internal body and a hydrophilic shell (same as, or similar to, hydrophilic-shell 128 of condensation-protrusions 124 shown in FIGS. 4a-4c).

Condensation-protrusions 524 are configured to condense moisture from the ambient air, using condensation-protrusions 524, wherein the dew droplets formed on the plurality of saturated hydrophilic-shells of condensation-protrusions 524, are collected by the gravity inside water-harvesting-device 520. Such a structure is suitable for dry areas having windy conditions.

In some embodiments, a plurality of water-harvesting-devices 520 are stacked up to form a standing array of water-harvesting-devices 520, as shown in FIG. 15. In such embodiments, only the bottom row water-harvesting-devices 520 have an enclosed bottom 528, while the water-harvesting-devices 520 of the second row and up, have an open bottom.

The invention being thus described in terms of several embodiments and examples, it will be obvious that the same may be varied in many ways. Such variations are not to be regarded as a departure from the spirit and scope of the invention, and all such modifications as would be obvious to one skilled in the art.

What is claimed is:

1. A water harvesting device for condensing moisture in the air and collecting the yield water, the device comprising:
   a) at least one device-body having a hydrophobic shell and an internal-body-core surrounded by and enclosed within said hydrophobic shell; and
   b) a plurality of condensation-protrusions disposed on said hydrophobic shell, wherein each condensation-protrusion comprises an internal-core and a hydrophilic-shell surrounding and enclosing said internal core,
wherein said device-body internal-body-core continuously extends to said device-body hydrophobic shell and into said hydrophilic shell of each one of said condensation-protrusions;
wherein when any of said condensation-protrusions is cooler than the moist air, condensation takes place and said hydrophilic-shell condenses and extracts the moisture from the air, so as to become harvested water; and
wherein when said hydrophilic-shell is saturated water flows on the surface of said hydrophobic shell, and wherein said hydrophobic shell is adapted to irrigate the flowing water towards at least one target location.

2. The water harvesting device of claim 1, wherein said internal-body-core is made of phase change material (PCM).

3. The water harvesting device of claim 1, wherein said internal-core is made of PCM.

4. The water harvesting device of claim 1, wherein said target location is a container.

5. The water harvesting device of claim 1, further comprising:
   a) an apparatus-irrigation subsystem configured to irrigate the flowing said condensed water towards said at least one target location, said apparatus-irrigation subsystem comprising:
      i. apparatus irrigation means for funneling said condensed water towards said at least one target location; and
      ii. a dropper irrigation unit,
wherein said dropper irrigation unit is at least partially penetrated into the ground;
wherein at least one target location is situated below the ground surface; and
wherein said irrigation means is configured to funnel said condensed water towards said at least one of said at least one target location via said dropper irrigation unit.

6. The water harvesting device of claim 5, wherein said target location is a container disposed inside said dropper irrigation unit.

7. The water harvesting device of claim 1, further comprising a cage-spacer that holds said device-body, including said plurality of condensation-protrusions disposed thereon, in a manner that exposes said device-body, and said condensation-protrusions thereon, to air flow.

8. The water harvesting device of claim 7, wherein said cage-spacer is a wired frame configured around said device-body.

9. The water harvesting device of claim 7, configured for being accommodated inside a bottle-like container.

10. The water harvesting device of claim 1, further comprising a plurality of said at least one device-body.

11. The water harvesting device of claim 1, further comprising a plurality of said at least one device-body, and having a net of wires structure.

12. The water harvesting device of claim 11, wherein said net of wires structure is wide open on a top side thereof, wherein said wires converge downwards towards one or more tips of said plurality of said device-bodies.

13. A water harvesting and collecting apparatus for collecting and harvesting moisture from the air and collecting the yield condensed water, the apparatus comprising:
   a) a multiplicity of water harvesting devices, wherein each said water harvesting device comprises:
      a) at least one device-body having a hydrophobic shell and an internal-body-core; and
      b) a plurality of condensation-protrusions disposed on said hydrophobic shell, wherein each condensation-protrusion comprises an internal-core and a hydrophilic-shell,
   wherein when any of said condensation-protrusions is cooler than the moist air, condensation takes place and said hydrophilic-shell condenses and extracts the moist from the air, being the harvested water; and
   wherein when said hydrophilic-shell is saturated water flows on the surface of said hydrophobic shell, and wherein said hydrophobic shell is adapted to irrigate the flowing water towards at least one target location;
   b) a multiplicity of cage-spacers, each fittingly embracing a respective said water harvesting device, wherein said cage-spacer is configured to keep said condensation-protrusions of each of said multiplicity of water harvesting devices exposed to air flowing there around;
   c) at least one bottle-like container configured to accommodate said caged water harvesting devices, said bottle-like container having an opening and a natural bottom at the opposing end of said bottle-like container, wherein said opening is configured to allow insertion of said caged water harvesting devices into said bottle-like container;
   d) an air-inlet-tube;
   e) a dropper irrigation unit; and
   f) a cap interface unit,
wherein said air-inlet-tube is in flow communication with cap-air-openings formed in said cap interface unit;
wherein bottle-air-openings are formed proximal to or at said natural bottom, to allow moist air entering said cap-air-openings, flow through said air-inlet-tube into said bottle-like container, and exit via said bottle-air-openings;
wherein said dropper irrigation unit is operatively at least partially penetrated into the ground;
wherein at least one target location is situated below the ground surface; and
wherein said cap-interface-unit is configured to interface between bottle-like container and said dropper irrigation unit, wherein said opening of said bottle-like container is pointing downwards towards the ground, allowing said condensed water to flow from inside said bottle-like container to said dropper irrigation unit and then to said at least one target location; and wherein said flow of air inside said bottle-like container facilitates condensation of moisture in the air by said exposed condensation-protrusions.

14. The water harvesting and collecting apparatus of claim 13, wherein said target location is a container disposed inside said dropper irrigation unit.

15. The water harvesting and collecting apparatus of claim 13, further comprising at least one pipe like shaped hollow main stem unit, said main stem unit having hollow bottle-receiving-pipes protruding away from said main stem unit,
   wherein a hollow space of each bottle-receiving-pipe is a continuation of a hollow space of said main stem unit; and
   wherein each of said bottle-receiving-pipe is configured to interface with one of at least one bottle-like container.

16. The water harvesting and collecting apparatus of claim 13, wherein a fan disposed proximal to or at said natural bottom, to thereby increase the upward flow of the moist air inside said bottle-like container.

17. The water harvesting and collecting apparatus of claim 16, wherein said fan is an electric fan is operated by solar energy obtained from at least one photovoltaic cell.

18. The water harvesting and collecting apparatus of claim 16, wherein said fan is wind operated fan.

19. A plant growing method comprising the steps of:
   a) a soil cultivating stage, comprising the steps of:
      i) providing a water harvesting, irrigating and storing system as in claim 13,
      wherein said internal-body-core and said internal-core are made of PCM;
      wherein a container is disposed inside said dropper irrigation unit;
      wherein said water harvesting and collecting apparatus further comprises an underground rechargeable fertilizer bucket containing a fertilizer; and
      wherein said store collected water is configured to draw said fertilizer before reaching said nearby planted plant;
      ii) selecting a designated planting location;
      iii) placing said porous aggregate inside a pothole formed at said designated planting location;
      iv) inserting said dropper irrigation unit into said porous aggregate; and
      v) allowing a preconfigured cultivating time to lapse; and
   b) a plant growing stage, comprising the steps of:
      i) removing said dropper irrigation unit from said porous aggregate;
      ii) planting a young seedling at said designated planting location;
      iii) selecting a new location near said designated planting location;
      iv) placing said water harvesting, irrigating and storing system at said new location; and
      v) placing said underground-irrigation subsystem configured to irrigate said store collected water from said water harvesting, irrigating and storing system towards said young seedling.

20. The plant growing method of claim 19, further comprising a step of placing a new one of said porous aggregate inside a pothole formed at said new location, before said placing said water harvesting, irrigating and storing system at said new location.

* * * * *